(12) United States Patent
Ciet et al.

(10) Patent No.: US 8,176,337 B2
(45) Date of Patent: May 8, 2012

(54) COMPUTER OBJECT CODE OBFUSCATION USING BOOT INSTALLATION

(75) Inventors: Mathieu Ciet, Paris (FR); Julien Lerouge, Santa Clara, CA (US); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1089 days.

(21) Appl. No.: 12/047,207

(22) Filed: Mar. 12, 2008

(65) Prior Publication Data

US 2009/0235089 A1 Sep. 17, 2009

(51) Int. Cl.
*G06F 12/14* (2006.01)
*G06F 9/45* (2006.01)
*G06F 11/00* (2006.01)

(52) U.S. Cl. ........ 713/190; 713/191; 713/192; 713/193; 713/194; 717/140; 726/22

(58) Field of Classification Search .................. 713/190; 717/140
See application file for complete search history.

(56) References Cited

U.S. PATENT DOCUMENTS

| | | | | |
|---|---|---|---|---|
| 6,366,673 | B1* | 4/2002 | Hollmann et al. | 380/28 |
| 6,668,325 | B1* | 12/2003 | Collberg et al. | 713/194 |
| 6,862,683 | B1* | 3/2005 | Wille et al. | 713/151 |
| 7,054,443 | B1* | 5/2006 | Jakubowski et al. | 380/28 |
| 7,539,875 | B1* | 5/2009 | Manferdelli et al. | 713/189 |
| 7,584,354 | B2* | 9/2009 | Graunke | 713/167 |
| 7,620,987 | B2* | 11/2009 | Shelest et al. | 726/22 |
| 7,779,394 | B2* | 8/2010 | Homing et al. | 717/136 |
| 2001/0034846 | A1* | 10/2001 | Beery | 713/201 |
| 2002/0129280 | A1* | 9/2002 | Wang | 713/201 |
| 2005/0160420 | A1* | 7/2005 | Kruta et al. | 717/174 |
| 2005/0210275 | A1* | 9/2005 | Homing et al. | 713/190 |
| 2005/0246554 | A1* | 11/2005 | Batson | 713/194 |

OTHER PUBLICATIONS

"Long Modular Multiplication for Cryptographic Applications", Lazio Hars. Cryptographic Hardware and Embedded Systems—CHES—2004 vol. 3156, Springer Berlin/Heidelberg, pp. 45-4; url: http://dx.doi.org/10.1007/978-3-540-28632-5_4.*

"Coarsely integrated operand scanning (CIOS) architecture for high-speed Montgomery modular multiplication", McLoone, M. et al., Field-Programmable Technology, 2004. Proceedings. 2004 IEEE International Conference; Issue Date Dec. 6-8, 2004; pp. 185-191; Print ISBN-0-78038651-5; DOI: 10.1109/FPT.2004.1393267; Cur. Ver. Feb. 14, 2005.*

* cited by examiner

*Primary Examiner* — Aravind Moorthy
*Assistant Examiner* — Feliciano Mejia
(74) *Attorney, Agent, or Firm* — Morrison & Foerster LLP

(57) ABSTRACT

In the field of computer software, obfuscation techniques for enhancing software security are applied to compiled (object) software code. The obfuscation results here in different versions (instances) of the obfuscated code being provided to different installations (recipient computing devices). The complementary code execution uses a boot loader or boot installer-type program at each installation which contains the requisite logic. Typically, the obfuscation results in a different instance of the obfuscated code for each intended installation (recipient) but each instance being semantically equivalent to the others. This is accomplished in one version by generating a random value or other parameter during the obfuscation process, and using the value to select a particular version of the obfuscating process, and then communicating the value along with boot loader or installer program software. This boot loader then selects which particular process to use for the code execution at the time of installation in accordance with the value. This results in different versions of the obfuscated code being provided to each recipient installation, which further enhances security of the code against reverse engineering by hackers.

10 Claims, 2 Drawing Sheets

COMPUTER OBJECT CODE OBFUSCATION USING BOOT INSTALLATION

FIELD OF THE INVENTION

This invention relates to computers, more specifically to computer security, and even more specifically to preserving the security of computer software using obfuscation.

BACKGROUND

The nature of software renders it susceptible to analysis and copying by third parties. There have been considerable efforts to enhance software security, see for instance U.S. Pat. No. 6,668,325 assigned to Intertrust Technologies Inc. There have been several efforts to provide technical protection for software. A well-known protection approach is called obfuscation, which typically relies on a rearrangement of the source code. Computer code (software or programs) comes in two chief types; the first is source code, which is as written by a human being (programmer) in a particular computer language. The source code itself is often then obfuscated. The other chief type is called object code or compiled code or binary code or machine code. This is the source code after having being processed by a special type of computer software program called a compiler; a compiler is routinely provided for each computer language. The compiler takes as input the alphanumeric character strings of the source code as written by the programmer, and processes them into a string of binary ones and zeros, which can then be operated on by a computer processor.

It is also known to obfuscate the compiled (object) code. The term "code morphing" is also applied to obfuscating object code. This is typically achieved by completely replacing a section of the object code with an entirely new block of object code that expects the same machine (computer or processor) state when it begins execution as a previous code section and will leave with the same machine state after execution as does the original code (thereby being semantically equivalent code). However, typically a number of additional operations compared to those of the original code will be completed, as well as some operations with an equivalent effect, by the morphed code. Code morphing makes disassembly or decompiling of such a program much more difficult. This is typically the act of taking the machine code and transforming it back into source code, and is done by reverse engineers or "hackers" who wish to penetrate the object code, using a special decompiler program. A drawback with code morphing is that by unnecessarily complicating operations and hindering compiler-made optimizations, the execution time of the obfuscated object code is increased. Thus typically code morphing is limited to critical portions of a program and so is often not used on the entire computer program application. Code morphing is also well known for obfuscating copy protection or other checks that a program makes to determine whether it is a valid, authentic installation or a pirated copy, for security purposes.

Therefore, typically the goal of obfuscation is to start with the original code and arrive at a second form of the code, which is semantically or logically equivalent from an input/output point of view. As pointed out above, this means that for any input to the code in the field of possible inputs, the output value of the code is the same for both the original code and the obfuscated code. Thus a requirement of successful obfuscation is to produce a semantically equivalent (but also protected) code to the original (unprotected) code.

As well known, computer programs called obfuscators perform obfuscating; they transform a particular software application (program) in object code form into one that is functionally identical to the original, but is much more difficult for a hacker to penetrate, that is decompile. Note that the level of security from obfuscation depends on the sophistication of the transformations employed by the obfuscator, the power of the available deobfuscation algorithms as used by the hacker, and the amount of resources available to the hacker. The goal in obfuscating is to provide many orders of difference between the cost (difficulty) of obfuscating vs. deobfuscating.

Generally obfuscation techniques, especially when applied to object code, are independent of the actual source code language used. This is because all source code when compiled results in a binary string of values. Hence, the type of obfuscation described here, which is applied to the object code, is applicable to code in all known computer languages.

Hence it is conventional that the obfuscation process is performed at one location or in one computer (machine) after the source code has been written and compiled. The obfuscated code is then transferred to a second computer/processor where it is to be executed after installation in associated memory at the second computer. (Note that the normal execution does not include any decompiling since there is no need on a machine-level basis to restore the source code. Decompiling is strictly done for reverse engineering purposes.) At the second (recipient) computer, the obfuscated code is installed and then can be routinely executed by the processor at the second computer. The obfuscated code is executed as is. The obfuscated code is usually slower to execute than the original code.

SUMMARY

In accordance with the invention, an obfuscation technique is provided for compiled (object) code. The object code is modified by a particular obfuscating function. Thus, rather than installing or downloading the original compiled code, instead the obfuscated code is downloaded or installed in the second (recipient) computer or computing device. Of course, computer devices here include for instance mobile telephones, cable television set top boxes, personal computers, laptop computers, personal digital assists, etc. The code execution process is here embodied in a boot loader or more typically a boot installer program associated with the obfuscated code. The code is never deobfuscated at execution. But for a set of functions, there exists various obfuscated versions. On the installation, the choice of which version is used is done by taking a random value, or by depending on the target device (computer) characteristics. As well known, there exist many programs semantically equivalent to the original (pre-obfuscation) code. The boot installer or boot loader program takes as its input the obfuscated object code, and outputs object code semantically (logically) equivalent to the original preobfuscated code. Of course, it would normally not be identical; that is what is meant by semantically or logically equivalent. Then this equivalent object code, which is executable, is installed on the recipient (target) device.

Various obfuscation techniques can be used in accordance with the invention. One is changing the order of mathematical or logical functions carried out in the code. Another is substitution of equivalent mathematical or logical functions. Typically in accordance with this disclosure, the obfuscated code is not produced in a single form. Instead in accordance with this invention, typically different forms (instances) of the obfuscated code are provided for a given piece of object code. Each obfuscated code instance is provided uniquely to a different installation (i.e., recipient computing device) and is thereby unique to that installation. Further in accordance with this disclosure, the obfuscation process may include generating a random number which is used to choose a particular obfuscation process and which is communicated with the obfuscated code. The random number when provided at the recipient device can be used to indicate which obfuscated function version is used. Instead of random values, one can use a function taking as input some target device particularities or characteristic. Then, each time the same code is installed on a given device, even if the installed code differs from device to device. The present method can also be used in conjunction with other known code protection techniques, such as masking, which can be applied to the obfuscated code; this provides an additional level of security.

DETAILED DESCRIPTION

Figure 1:
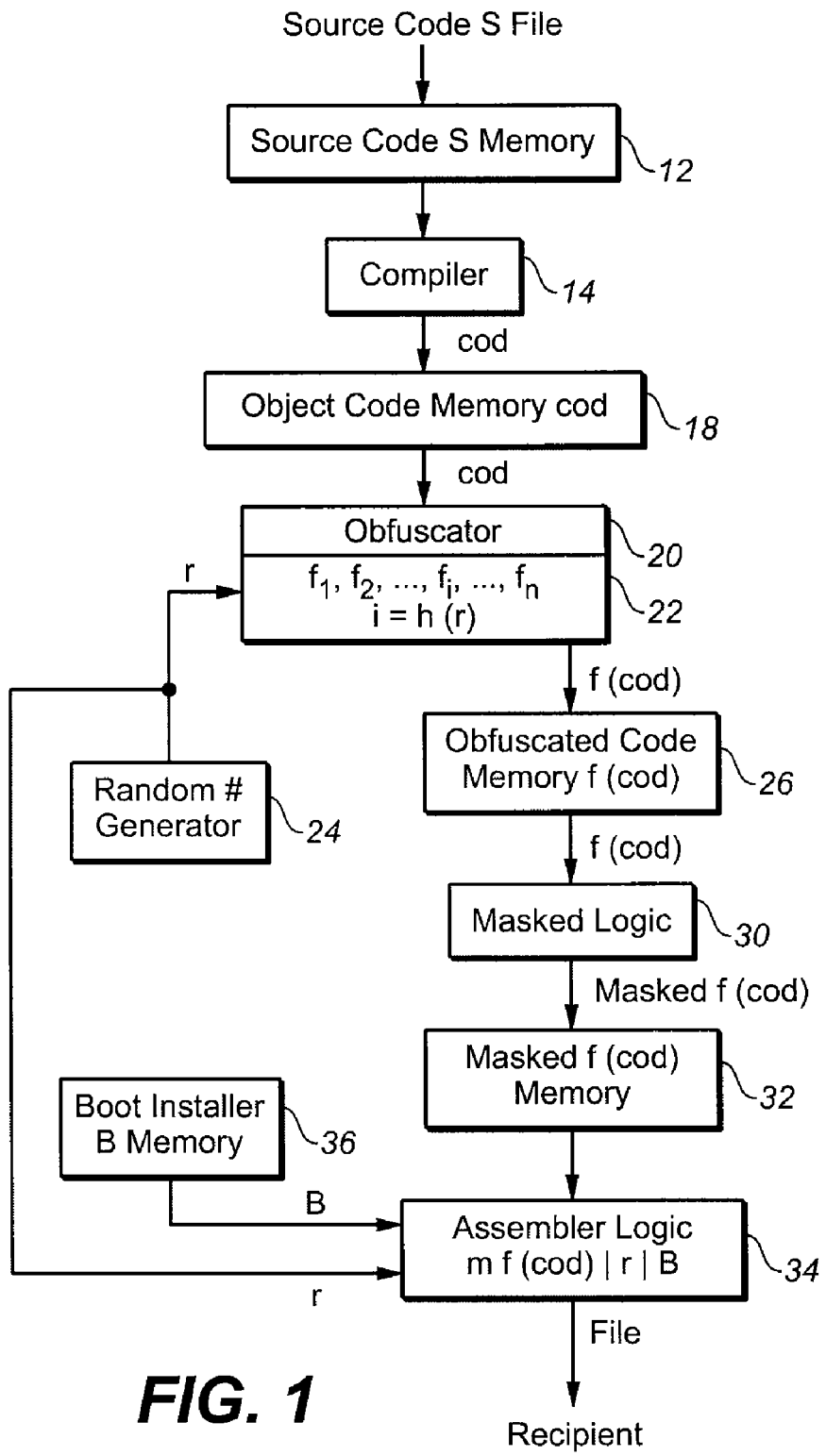
FIG. 1 shows a flowchart and associated apparatus for an obfuscating process in accordance with the invention.

FIG. 1 shows in a combined flowchart and apparatus block diagram a process for encoding, that is obfuscating, a piece of computer object code (file) in accordance with this disclosure. First one begins with a source code file designated here "s" written in a particular computer language. This file is routinely provided stored in conventional computer readable memory 12. File s is then subject to conventional compilation by a suitable (language specific) compiler 4. As mentioned above, a compiler provided is commercially for each computer language. This is all routine and well known in the field. The output of the compiler 4 is the object/machine/binary/compiled code file designated here cod. This code file cod is then stored again in some sort of computer memory 20, such as a register or other short term memory. This object code cod is then input to an obfuscator 20. Obfuscators per se are well known.

However the obfuscator 20 (a computer program) here has special properties which provide advantages in accordance with this disclosure. In this case, the obfuscator instead of providing only a single obfuscation function as is conventional, instead includes a set of obfuscation functions here designated f1, f2, ..., fi, ..., fN 22. In this case, the value of i is a function of an input number r which is, e.g., provided from a random number generator 24, which is a conventional piece of software or logic (circuitry). Note that the various operations accomplished in FIG. 1 may be conventionally accomplished by computer logic, computer software, or a combination thereof. Hence the output of the obfuscator 20 is the obfuscated code here designated f(cod). Obfuscated file f(cod) is then stored in a memory 26 and then provided to the masker logic 30 in one embodiment. Masking is a well known additional protective step for code, in addition to obfuscation and is accomplished by computer hardware or software. The masked object code file, here designated masked f(cod), is then stored in memory 32 and then provided to an assembler element or logic 34. Other inputs to the assembler element 34 are the random number r and a boot installer program B supplied from its memory 36.

Boot installers are well known in the computer field. There is also what is called in the computer science field a boot loader. A boot loader is a computer program which usually has three sub-programs. The first is a boot sector program which is directly loaded by the computer's basic input/output system (BIOS) at computer boot time and is, e.g., 512 bytes in length for a personal computer. (This parameter is, for instance, for the Linux or Windows operating systems.) The second is the second stage program which is loaded by the boot sector program and allows the actual booting of the computer or computer processor. The third is a boot loader installer, which is not run when the computer system is booted, but is used to install the boot loader and the second stage program on to the boot disk. These all have to be stored in special memory locations in a computer system. Booting, of course, refers to starting up a computer or processor. Note that the actual boot program is the second stage program, which typically contains a user interface and kernel (operating system kernel) loader.

The third program, which is the boot loader installer also called the boot installer located at 36, is only run (executed) when the boot loader program is installed on the hard disk or other non-volatile memory of the computer (target device). Typically this installer is rerun each time the configuration of the computer system is changed or any file has been updated. It indicates the boot memory sector where the second stage boot loader is to be located in memory in terms of addresses. It also informs the second stage boot loader where all relevant information is located in memory in terms of the configuration and kernels.

For further background, BIOS is the firmware in the read-only memory of a personal computer or other type of computing device. When the computing device is first powered up, the BIOS is the first program that runs, since all other programs must be loaded into random access memory before being run. The BIOS typically contains various parts, including a power ON self test; a setup menu; and the boot sector loader.

In accordance with this invention, a special boot installer program is provided, as further described below. In any case returning to FIG. 1, the assembler logic 34 assembles a file, which includes the masked object code mf(cod), random number r, and the boot installer program B. This file is provided to the recipient (target) computing device to be installed there, instead of file cod.

Thus the original compiled code cod, which is installed in the prior art where there is no obfuscation, is here replaced by the file identified as f(cod)/r/B. As explained further below, program B contains the execution function version. In that way it differs from a conventional boot installer. Thus FIG. 1 shows the obfuscation or encoding process. This takes place before the object code to be protected is distributed to the various recipient devices, that is installed in them. Installed here refers to placing the particular program in the recipient computer memory.

Figure 2:
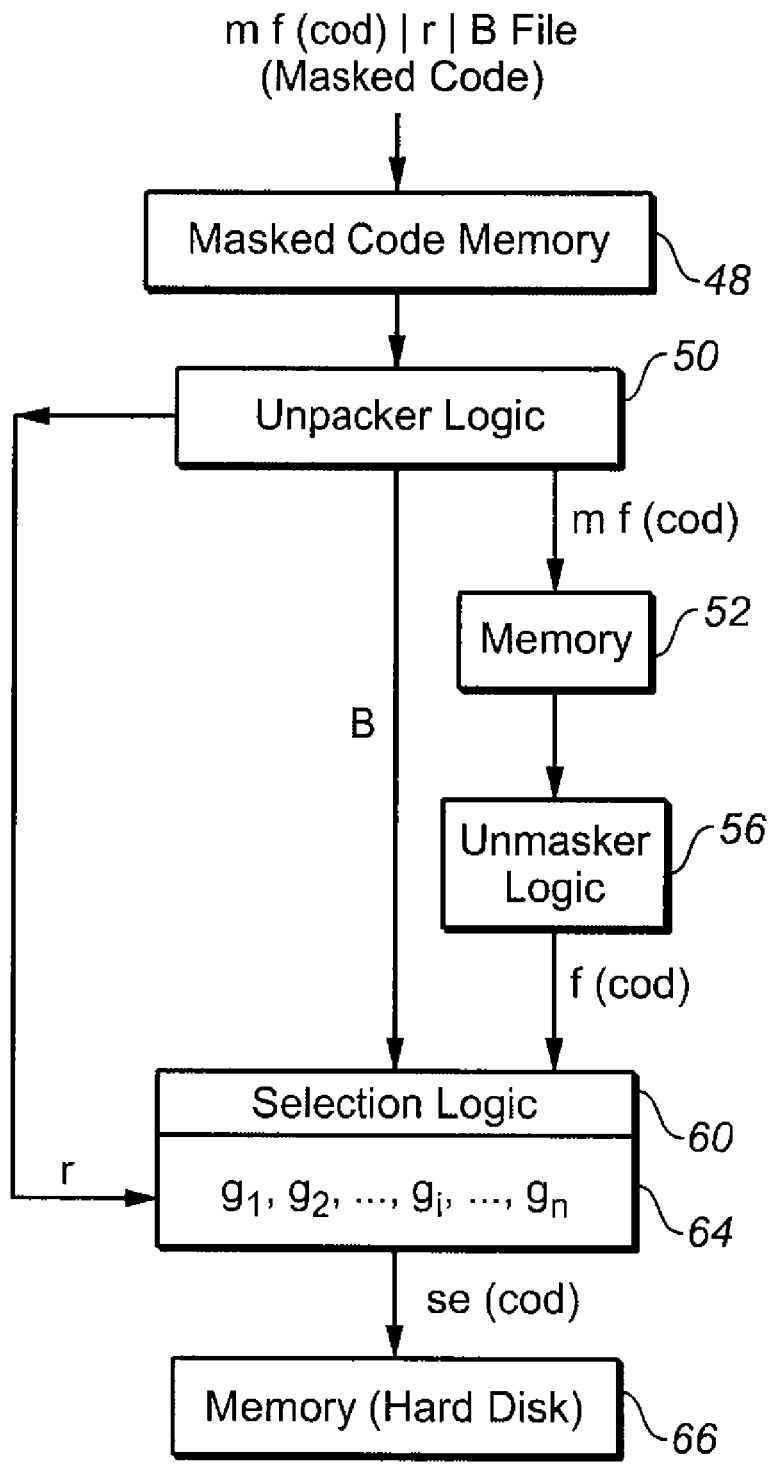
FIG. 2 shows a flowchart and associated apparatus for a deobfuscating process in accordance with the invention.

FIG. 2 then shows the complementary use of the obfuscated file in the recipient device. In the top portion of FIG. 2, the obfuscated designated in FIG. 1 file mf(cod)/r/B is shown here designated the "masked code" file. This is then conventionally installed in memory 48 in the recipient device in which it is to be installed. This memory 48 is coupled to an unpacker logic element 50, which partitions the file into its three elements, r, b, and mf(cod). The masked code mf(cod) is then stored in its own memory 52 and provided to an unmasker logic element 56, which is complementary to the masker logic 30 in FIG. 1, to unmask the code. Of course the masking/unmasking aspects are not required here; they provide additional level of security and may include any conventional masking process. In any case, the resulting unmasked code f(cod) is then provided to a selection logic element 60.

The selection logic 60 also has supplied to it the boot installer program B and the value of the random number r. The random number r is used to designate or select which one of a set of functions are to be used. Here the functions (processes) are labeled g1, g2, ..., gi, ..., gn 64. To express this logically, g(f(cod))=cod. Thus each of the functions gi corresponds to one of the obfuscation functions fi. The selection logic then, using these functions in the boot installer program B executes installer program B, and outputs the file secod which is to be installed. Note that the selection logic cannot operate without the boot installer program B since that contains the actual functions; they are not "hardwired" into (part of) the selection logic here. This is to provide better security. The object code file secod is then installed in the recipient device's hard disk or other non-volatile memory 66 to be executed as needed.

Note that the type of software (code) protected here is not specific; it may be an application program or any other type of program to be run by a computer device. In other words the boot-installer program B, as executed by the installation logic, takes as its input f(cod) and the random number value r (or some other selection value as described above). It outputs the code secod, which is semantically equivalent to the code cod=g(f(cod)). The combination of the two functions f, g is a composition function. In one embodiment, installer program B is then erased from its memory after the installation, so it is not available to a hacker.

The following gives examples of specific types of obfuscation that are suitable in accordance with this invention. However these are illustrative and not limiting. Other semantically equivalent particular obfuscation functions may be used, as will be clear to one skilled in the art, in light of this disclosure. Generally for better security, the obfuscation function f should be a "one-way" function, so it is not easily reversed by a hacker. That is, given the obfuscated code f(cod), it should be very difficult for a hacker to arrive at the complementary function g. One of the goals is to prevent hackers from sharing what they find during their attacks. Further, in one embodiment each individual computer device (installation) is provided with a unique value of the random number r (or other function selection parameter), and hence a different instance of the obfuscated code f(cod).

One type of suitable obfuscation is referred to here as obfuscating due to the order of functions performed. Consider the object code cod where various logical or mathematical functions are included in the object code. In this case, consider two such functions here designated $10_i$ and $11_i$ for any i equal to 0 to N, where N is a positive integer. Assume that these functions can be executed in any order such that permuting (changing) the order of the functions gives a semantically equivalent result. An example of such functions would be for instance input order of multiplication and addition (but not subtraction and division). Thus in this case the boot installer B program uses the random value r as indicated above to determine the order of execution for each pair of functions $10_i$, $11_i$. This also illustrates how the random number r can be used in the boot loader process described here.

A more complicated obfuscation technique here uses a set of equivalent functions. There are various ways to implement a given mathematical or logical function as typically carried out by computer code. For instance, take the case where the goal is to project computer code which provides a modular multiplication of a large number. As well known in the mathematics field, there are various ways to do this. There is what is known as the Montgomery reduction or Montgomery multiplication, the Barrett multiplication, and the Quisquater multiplication. These are all ways of accomplishing the same multiplication task, but using different mathematical functions. These are each algorithms which are well known and have been implemented in various computer programming languages. (They are typically used in public key cryptography for encrypting and signing digital data, but have other broader uses. This is because public key cryptography typically relies on factoring of large numbers.) Hence in one embodiment, the various obfuscation functions which can be used for various instances of the code cod for obfuscation may be respectively to choose one of the Montgomery multiplication, the Quisquater multiplication or the Barrett multiplication for a modular multiplication, since these are all semantically equivalent but employ different object code.

Furthermore as well known, the Montgomery multiplication has two main types, one of which is referred to as coarsely integrated operand scanning (CIOS) and the second of which is referred to as finely integrated operand scanning (FIOS). This gives two more variations of semantically equivalent functions. Further for instance even within the CIOS Montgomery multiplication, there are various ways to perform it using 16 byte, 32 byte or 64 byte values as the base. This gives yet more choices of semantically equivalent obfuscation functions.

Hence assume that the function f has several implementations as pointed out above, f1, ..., fi, ..., fN, where the boot installer B can pick using the random number r which complementary function gi is to be used. Boot installer B chooses which fi is used and installs it. Of course this means that the same particular code instance secod is not installed on all the recipient machines (platforms), but for each platform a semantically equivalent instance of the code secod is provided. Thus each platform (recipient device) may receive its own unique object code secod; however, all the object code instances are semantically equivalent when executed. Of course, this makes penetration by a hacker even harder, since each device having code secod installed by a hacker will have a different instance of that code installed. This makes decompiling the code by the hacker even more difficult. This also prevents sharing information for purposes of reverse engineering (hacking).

Hence while in accordance with the invention, the actual individual obfuscation functions used for each code installation (instance) may be conventional, the obfuscated code instance itself is different for each installation and thereby specific to each installation (recipient platform machine). Since a random number or other parameter can be used to choose which particular obfuscation function is used, if the random number or parameter is correctly managed (protected) a hacker cannot know which of the particular obfuscation functions has actually been used.

Also note that it is possible for instance that all the object code to be protected is obfuscated rather than only a part thereof. Then the boot installer can determine when and which defuscation functions are to be used and which are not to be used.

This disclosure is illustrative but not limiting; further modifications will be apparent to those skilled in the art in light of this disclosure and are intended to fall within the scope of the appended claims.

We claim:

1. A method of protecting computer program code, comprising the acts of:
providing a file of computer program source code;
storing the file in a first computer readable memory;
compiling the stored file of source code into compiled code at a compiler;
obfuscating the compiled code, using one of a plurality of obfuscation processes wherein the obfuscation processes are each one of a Montgomery multiplication, a Quisquater multiplication, and a Barrett multiplication;

providing a boot installer program including a plurality of deobfuscation processes, one of which is complementary to the one obfuscation process;

storing the boot installer program in a second computer readable memory;

combining the obfuscated code and the boot installer program into one file; and storing the one file in a third computer readable memory.

2. The method of claim 1, further comprising the act of masking the obfuscated code.

3. The method of claim 1, wherein the obfuscated code when executed is equivalent but not identical to the compiled code.

4. The method of claim 1, further comprising the acts of:
generating a random number;
selecting the one obfuscation process for the act of obfuscating based on the random number; and
associating the random number with the obfuscated code.

5. The method of claim 4, wherein the obfuscation processes are each a different order for performing a plurality of functions in the compiled code, and wherein the random number determines the particular order.

6. The method of claim 4, where in the obfuscation processes are each equivalent to one another; and
further comprising selecting one of the obfuscation processes for each instance of the obfuscated code using the value of the random number, wherein each such instance uses a different one of the obfuscation processes.

7. The method of claim 1, further comprising the act of:
selecting the one obfuscation process based on a characteristic of a target device.

8. The method of claim 1, wherein a plurality of Montgomery multiplication processes are provided, using coarsely integrated operand scanning and one using finely integrated operand scanning.

9. The method of claim 8, wherein a plurality of coarsely integrated operand scanning processes are provided, each having a base value of a different length.

10. Apparatus for protecting computer code, comprising:
a memory for storing a file of computer program source code;
a compiler coupled to the memory for compiling the source code into compiled code;
an obfuscator coupled to the compiler to output obfuscated code, using one of a plurality of obfuscation processes wherein the obfuscation processes are each one of a Montgomery multiplication, a Quisquater multiplication, and a Barrett multiplication;
a memory storing a boot installer program including a plurality of deobfuscation processes, one of which is complementary to the one obfuscation process;
an assembler which combines the obfuscated code and the boot installer program into one file; and
a third computer readable memory for storing the one file.

* * * * *